Nov. 17, 1970 H. WEISS 3,541,575

COMPUTER AND RECORDER

Filed Oct. 25, 1968 3 Sheets-Sheet 1

INVENTOR.
HANS WEISS

BY Kenwood Ross and
Chester E. Flavin
ATTORNEYS.

Nov. 17, 1970 H. WEISS 3,541,575

COMPUTER AND RECORDER

Filed Oct. 25, 1968 3 Sheets-Sheet 2

INVENTOR.
HANS WEISS

BY Kenwood Ross and Chester E. Flavin
ATTORNEYS.

INVENTOR.
HANS WEISS
BY Kenwood Ross and
Chester E. Flavin
ATTORNEYS.

United States Patent Office 3,541,575

Patented Nov. 17, 1970

3,541,575

COMPUTER AND RECORDER

Hans Weiss, 23 Overbrook Road,
Vernon, Conn. 06086

Filed Oct. 25, 1968, Ser. No. 770,655
Int. Cl. G07c 1/06
U.S. Cl. 346—82 4 Claims

ABSTRACT OF THE DISCLOSURE

A computing and recording system including a record receiver physically cooperant with an assemblage of clock-driven instrumentalities for punching sets of perforations therethrough for showing both the commencement of a measured time increment upon a first insertion of the record-receiver into the assemblage and the total time elapsed or money value of the time increment between such time increment commencement and its termination, as identified by a next sequential insertion of the record-receiver into the assemblage with the elapsed time or money value computation and recordation being in accordance with a reading by instrumentalities of the assemblage of the first set of perforations upon the second insertion of the record-receiver into the assemblage.

SUMMARY OF THE INVENTION

The invention teaches means for computing quantitative values, such as for example elapsed time or the money value thereof by registering the commencement and termination of incremental changes in a mathematical progression and for recording the duration of the interval between such beginning and terminus, or the money value thereof.

A time clock mechanism is shown which computes and records, on a time card, elapsed time or time between a punch-in time and a punch-out time or any other appropriate quantitative value represented thereby, the mechanism being designed to provide both a computation and recordation of the actual elapsed time or other value between the time when a record card is first introduced thereto and the time when the record card is next sequentially introduced thereto so as to provide useful information with respect to such as the actual time consumed upon a particular job or jobs of an employee's actual working time. The same structure, with minor changes, could compute and record a value of that time interval in terms of dollars and cents with respect to the employee's time rate, if such was desired or could compute any other appropriate value representative of the time interval.

The structure aspect of the invention envisions the impression of an initial time record on a record card or receiver, which impression serves subsequently as a reader or finder when it is desired to attain a computation of the elapsed time or other value from that initial time to a subsequent terminal time and a recordation of that intelligence for subsequent reference purposes.

In another manner of description, the invention envisions a timing mechanism which includes a time-in wheel or wheels movable rotatably and incrementally in manner to present different portions of its or their peripheral area or areas, representative of different time as time progresses, into and out of contacting position with electrical connecting means whereby, as the record card to be perforated with intelligence respecting the time of insertion, called the commencement time or in-time, is inserted into a first record card receiving area of the timing mechanism, a card punching device or devices controlled by and responsive to the position or positions of the time-in wheel or wheels is or are energized so as to perforate the record card with such intelligence, and additionally includes a time-out wheel or wheels which is or are movable rotatably and incrementally in manner to present different portions of its or their peripheral area or areas likewise representative of different time as time progresses into and out of contacting position with other electrical connecting means in manner whereby, as the previously perforated record card is subsequently inserted into a second record card receiving area of the timing mechanism, a card reading device or devices reads or read the first perforation or perforations and coacts or coact with other card punching device or devices connecting therewith and energized thereby so as again to perforate the record card, this time with intelligence respecting the elapsed time or other value between the first and second record card insertions.

As here specifically exemplified, the invention is shown to permit the reading of time over a twelve hour time period with each such hour being subdivided into tenths of an hour. Of course, it is to be understood that same is merely illustrative, the invention being adapted for use with any time period, such as, for example, a twenty four hour period which could be further broken down into the sixty minutes of each such hour, and even conceivably further broken down into the sixty seconds of each minute, all depending upon the particular computing and recording purpose to be served. Any interval of time desired to be measured and any related value can be computed within the spirit and letter of the invention.

Stated otherwise, the invention relates to the structure and functioning of a mechanism for producing the recordations upon the appropriate perforable areas of a cooperant record card, certain perforations being firstly made in the card at a punch-out time and representing a value at the starting point of a time increment to be measured and certain other perforations being secondly made in the card at a punch-out time and representing a value of the time interval elapsed between the starting and termonal times or other value thereof.

Conceivably, the structure could be so modified that the terminal time per se could also be physically recorded on the record card as well as the time interval elapsed or other value.

As envisioned, the record card with the data impressed thereupon is adapted to be subsequently presented to a computer of the IBM type for subsequent processing and it is to be stressed that the invention has been conceived around and predicated upon such subsequent usage.

DESCRIPTION OF THE PREFERRED EMBODIMENT

It must first be explained that the invention comprehends a method and an apparatus for carrying out that method. The method is intimately related to the use of the apparatus, it being obvious that the commercial utility of the apparatus is rendered nugatory if no satisfactory method is indicated for using same.

The invention, as shown, includes a rectangular shaped record card 10 which is cooperant with a mechanism generally indicated by 30, the one being dependent upon, and useless without, the other.

The card envisioned is adapted for use in computers of the IBM type.

Figure 2:
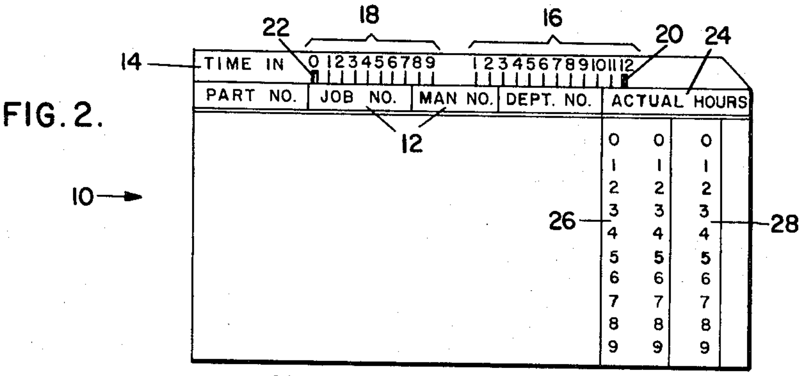
FIG. 2 is a view, in top plan, of the record card bearing symbols of units of elapsed time, same having been perforated with a first pair of perforations representative of a starting time following it first introduction into and withdrawal from the mechanism.
Figure 3:
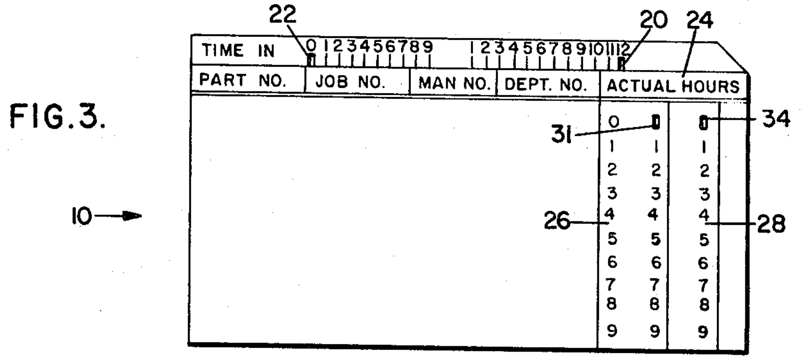
FIG. 3 is a view, in top plan, of the record card of FIG. 2, same having been next successively perforated with a second pair of perforations representative of an elapsed time following its second introduction into and withdrawal from the recording mechanism.
Figure 1:
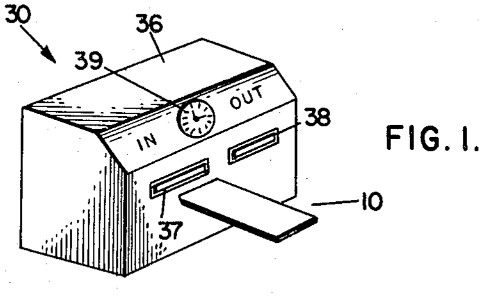
FIG. 1 is a small scale view, in perspective, of the computing and recording mechanism.

Card 10 is previously provided with certain preselected indicia thereupon, as shown in FIGS. 2 and 3. It may bear printed data in the form of spaces 12 bearing titles such as "Part Number," "Job Number," "Operator Number," "Department Number" and like references into which spaces appropriate intelligence may be manually entered.

In another space or area 14 titled "Time In," two spaced sets of a plurality of equi-spaced lines may be delineated, a first set 16 (on the right as viewed in the figures) which is representative of twelve hours of the AM or the PM and a second set 18 (on the left as viewed in the figures) is representative of ten tenths of an hour.

In the punching operation, one of the lines of set 16, representative of a specific hour, and one of the lines of set 18, representative of a specific tenth of an hour, will be punched out by means of perforations. In FIG. 2, a first such perforation, bearing reference numeral 20, will be seen to have been made in the last such line of set 16 on the right, and being representative of the "12" hour, meaning in point of time something during the 12th hour of the AM or PM, and a second such perforation, bearing reference numeral 22, will be seen to have been made in the first such line of set 18 on the left, and being representative of the "0" tenth of an hour, meaning in point of times something within the first six minutes of the represented hour.

In another space 24, titled "Actual Hours," a series of vertical columns bearing printing representative of, in the case of a first pair of columns 26 on the left, the series of hours "0" to "9" starting at the top of each of the columns, and in the case of the single column 28 on the right, the series of tenths of an hour from "0" to "9" starting at the top of each of the columns.

The hourly intervals from 0 to 9 inclusive represent respectively the ordinals of the first 10 consecutive hours, the first ordinal "0" representing a point of time within the first hour unit at which less than one hour has elapsed since the beginning of the time being measured.

The hourly intervals from 10 to 12 inclusive are represented by the combination of the respective ordinals in the first and second columns of the first pair of columns 26.

The minute intervals from 0 to 9 inclusive represent respectively the ordinals of 10 consecutive units of time, each in the form of a tenth of an hour (or six minutes), the first ordinal "0" representing a point of time at which less than six minutes has elapsed since the beginning of the time being measured.

In actual use, if one hour of elapsed time is to be recorded, the perforation is through the "1" in the second column (the right) of vertical column 26. If eleven hours of elapsed time is to be recorded, perforation is through the "1" in each of the columns of column 26.

If less than six minutes (one tenth of an hour) of elapsed time is to be recorded, the perforation is through the "0" in vertical column 28. If from 54 to 59 minutes (nine tenths of an hour) elapsed time is to be recorded, the perforation is through the "9" in column 28.

The punched card in FIG. 3 shows perforations 20 and 22 representative of "12 hours" (perforation 20) and "0 tenths of an hour" (perforation 22), unisonly representative of a punch-in time of any time between 12:00 and 12:05. Perforation 31 in column 26 represents "0 hours" and perforation 34 in column 28 represents "0 tenths of an hour" signifying unisonly an elapsed time of from 0 hour 0 minutes to 0 hours 5 minutes.

When card 10 is inserted into the appropriate interior portion of mechanism 30 at a punch-in time, such insertion produces energization of the mechanism so that the card is perforated in space 14 with a first pair of perforations, by punching means, which pair of perforations unisonly will represent a starting time in terms of an hour and a tenth of that hour. When next inserted into the mechanism, at a punch-out time, the card is perforated with other perforations in space 24 by other punching means, which other perforations unisonly will represent the interval elapsed since the respective starting time, in terms of the hour and tenth of the hour or in other terms of value, there being computing means within the mechanism for finding and reading the first registered pair of perforations and controlling the location of the second set of perforations so that the intelligence recorded is reflected not in terms of a punch-out time but rather in terms of elapsed time between the moment of first punch-in and the moment of second punch-out or other value representative of that elapsed time.

Stated otherwise, the mechanism produces first perforations in a first pattern under impulses from motor driven clock wheel mechanisms, and produces second perforations in a second pattern, also under impulses from motor driven clock wheel mechanisms, such latter pattern being physically coordinated with and determined by the pattern of the first perforations wherefor the second perforations represent a numerical value of the progression representative of the elapsed time intervening between the start and terminus or of some other value of that time.

The card-cooperant-time-controlled mechanism 30 is illustrated in FIG. 1 and FIGS. 4–11 inclusive and includes a casing 36 provided on its front wall with an "In" slot in bezel 37 on the left side and an "Out" slot in bezel 38 on the right side, and provided with a clock 39 nested within and flush with one of the walls of the casing.

Figure 4:
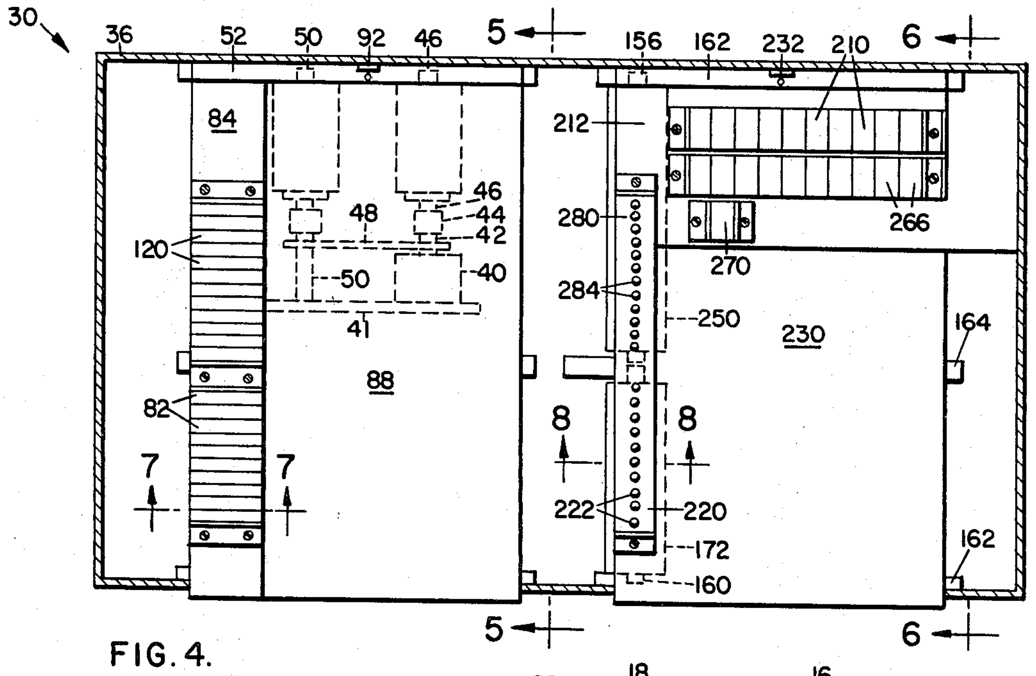
FIG. 4 is a view, in top plan, of the recording mechanism, with the top cover removed.

The area within the casing is divided into two general work zones, a time-in zone on the left side and a time-out zone on the right side, as viewed in FIG. 4, and serviced by the "In" and "Out" slots respectively.

The prime controller of the punch-in mechanism is a conventional synchronous electric clock motor 40 mounted on a wall 41 and having a central drive shaft 42 extending therefrom and coupled by coupling means 44 to an hour wheel shaft 46, which hour wheel shaft is intergeared by gearing 48 with a tenths wheel shaft 50 disposed in spaced parallelism therewith.

If preferred a separate motor or solenoid mechanism could be used for the direct drive of each such wheel shaft.

The outboard end of each such wheel shaft is journalled in a bracket 52 fixed to one of the walls of casing 36.

Wheel shafts 46 and 50 are so intergeared that the hour shaft rotates 360° or one revolution in each twelve hours in twelve equal incremental movements and the tenths wheel rotates 360° or one revolution every hour in ten equal incremental movements, the incremental movements preferentially being quick so as not to interfere with the recording process.

Figures 7, 8, 9, 10:
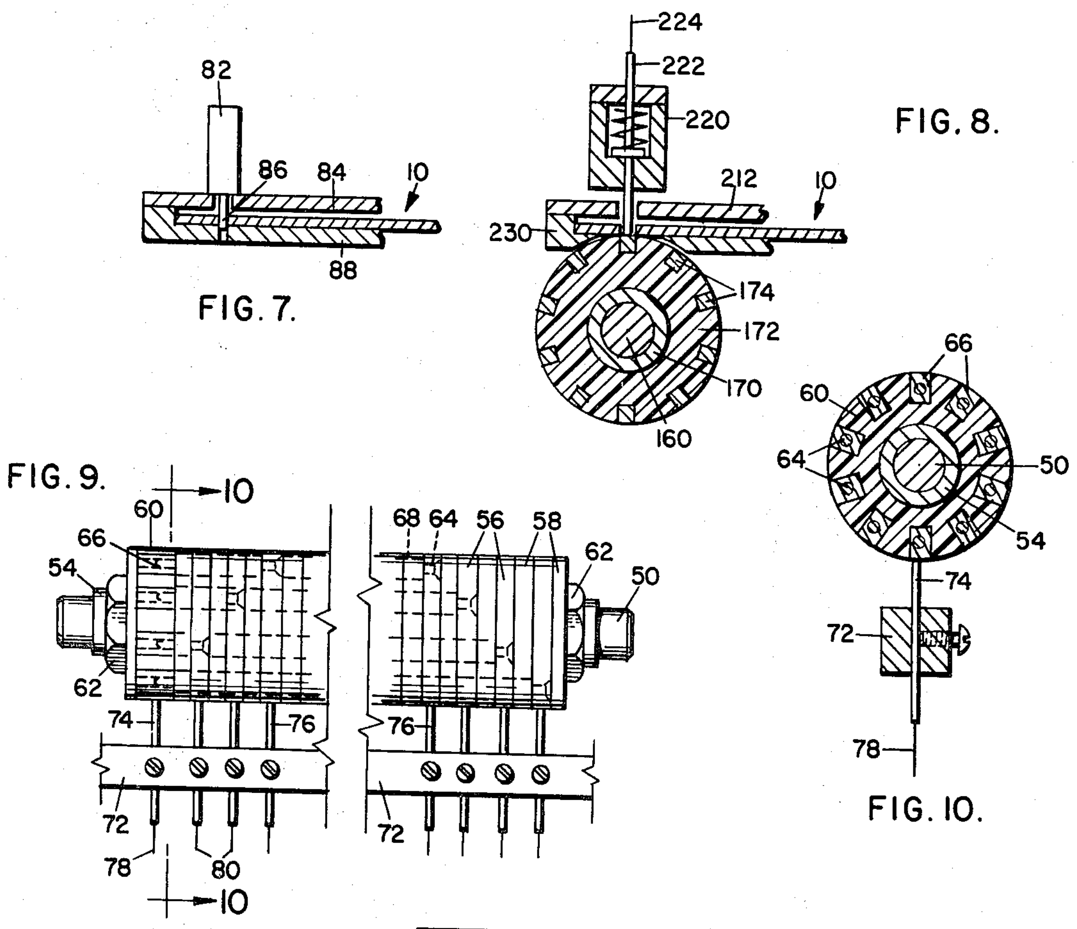
FIG. 7 is a fragmentary detail view, in section, of the in-punch subassembly taken on line 7—7 of FIG. 4 and shown with a time card in punch-in relationship therewith.
FIG. 8 is a fragmentary detail view, in section, of the punch-out subassembly taken on line 8—8 of FIG. 4 and shown with a time card in punch-out relationship therewith.
FIG. 9 is a broken detail view, in side elevation, of the tenths wheel of the punch-in subassembly.
FIG. 10 is a detail view, in section, on line 10—10 of FIG. 9.

Tenths wheel shaft 50, shown in FIGS. 9 and 10, has sleeved therearound an insulated bushing 54 upon which a series of ten annular metallic discs 56, spaced from each other by means of an alternating series of annular non-metallic insulating discs 58, are mounted in circumscribing manner. At the inboard end of tenth wheel shaft 50, an annular drum 60 of non-metallic material is sleeved upon bushing 54. The assemblage of metallic discs 56 and insulating discs 58 and drum 60 are held in tight adjacency with respect to each other by suitable means to aid their rotation unisonly with the supporting shaft.

The assemblage of alternating metallic and insulating discs is provided with ten circumferentially-arranged equi-spaced longitudinally-extending lead line openings therethrough, through which lead lines 64 are extended, each lead line having an outboard end terminating at and being electrically connected to a respective one of the metallic discs 56 and having an inboard end terminating at and being electrically connected to a respective metallic slug 66 seated in a respective one of a series of circumferentially-arranged equi-spaced radially-extending peripheral slots in drum 60, each slug 66 having an outer surface flush with the drum periphery. Each lead line is insulated from all metallic discs 56 other than the one to which it is directly connected, all so as to preclude electrical contact except the desired specific contact and may be by such means as by conducting each lead line through a nonconductive tube 68 extended through its respective aligned lead line openings in the discs for the distance between drum 60 and the respective metallic disc.

Disposed below and in parallel relataionship with tenth wheel shaft 50 is a suitably mounted brush carrier 72 supporting an upstanding flexible brush 74 (one end of which is in continuous wiping contact with that slug 66 of drum 60 which is in the "six o'clock" position according to the rotative position of the assemblage and the opposite end of which is connected by a lead line 78 to a starting switch subsequently to be described) and a plurality of ten equi-spaced upstanding flexible brushes 76, there being one such brush for each tenth of the hour from 0 to 9, and each being vertically-aligned below its respective metallic disc 56 (with one end of each brush being in continuous wiping contact with its metallic disc and the opposite end being connected by a respective lead line 80 through a relay 81 to a respective punch operator 82 of a bank of tenth hour solenoid-activated punch operators disposed on a shelf 84 in casing 36).

Each punch operator 82 includes a solenoid-operated punch 86 for perforating card 10 when the card is inserted through slot 37 and passed along the upper card-receiving surface of a card plate 88, with the opposite upper and lower edges of the card (the left and right hand edges thereof as it is fed into slot 37) having guided engagement with suitable guide walls in plate 88, energization ensuing when the forwardmost edge of the card contacts a starting switch 92 suitably connected to a power supply.

Suitably-aligned openings in card plate 88 serve to nest punches 86 as same are motivated downwardly in the card-perforating process, the record card being properly aligned with respect to the punches of the punch operators by means of the guide walls so that each activated punch correctly perforates the card at the correct line of the card and then retracts to original position to permit card withdrawal.

Tenth wheel shaft 50 and its supported assemblage of component rotates 360° in each hour in ten equal incremental movements so as to present one slug 66 of drum 60 in the lowermost "six o'clock" position in contact with brush 74 at all times, the incremental rotative movements being accomplished quickly and positively, as aforesaid.

Figure 5:
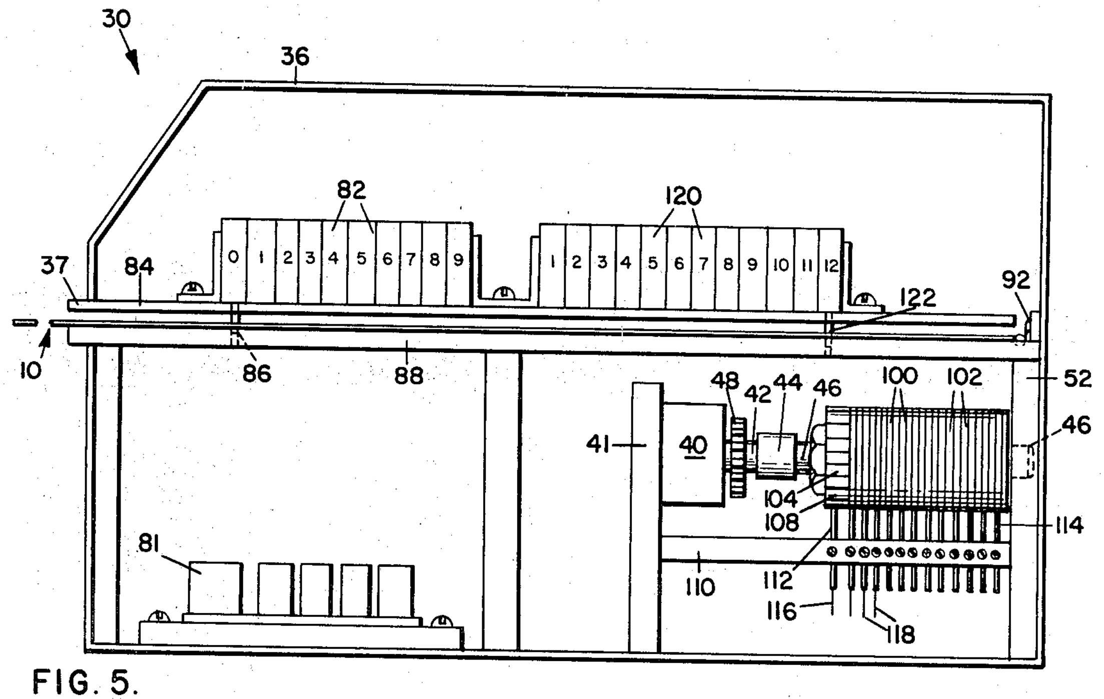
FIG. 5 is an enlarged view, in section, on line 5—5 of FIG. 2.

The hour wheel is similarly structured and accordingly is not detailed but is observable in FIGS. 4 and 5.

Hour wheel shaft 46 mounts a bushing which has sleeved therealong a series of twelve annular metallic discs 100, spaced from each other by means of an alternating series of annular non-metallic insulating discs 102, and at its inboard end has an annular drum 104 of non-metallic material sleeved thereupon, the assembled metallic discs 100 and insulating discs 102 and drum 104 being held with respect to each other by suitable means so as to rotate unisonly with their shaft.

The assemblage of alternating discs is provided with twelve circumferentially-arranged equi-spaced longitudinally-extending lead line openings therethrough, through which lead lines are extended, each lead line having an outboard end terminating at and being electrically connected to a respective one of the metallic discs 100 and having an inboard end terminating at and being electrically connected to a respective metallic slug 108 seated in a suitable radially-extending slot in drum 104, each slug having an outer surface flush with the drum periphery. As with the lead lines of the tenths hour wheel, each is insulated from all metallic discs except one.

Disposed beneath and in parallel relationship with hour wheel shaft 46 is a brush carrier 110 which supports a flexible brush 112 (which is in continuous wiping contact with one of the metallic slugs 108 of drum 104 according to the rotative position of the assemblage upon the hour wheel shaft) and a plurality of flexible brushes 114 (there being one for each hour from 0 to 11 vertically-aligned with its respective metallic disc 100, the upper extremity thereof being in continuous wiping contact therewith.)

The opposite lower extremity of brush 112 is connected by a lead line 116 to starting switch 92 and the opposite lower extremity of each brush 114 is connected by a respective lead line 118 to a respective relay and punch operator 120 of a bank of hour punch operators on shelf 94.

Each punch operator includes a solenoid-operated punch 122 for perforating card 10.

Hour wheel shaft 46 and its supported assemblage rotates 360° in each hour in twelve equal incremental movements so as to present that splug 108 of drum 104 in the lowermost, so-called "six o'clock," position for continuous contact with brush 112 until the next subsequent incremental rotative movement.

As card 10 is inserted through slot 37, and as energization ensues when the card contacts starting switch 92, the activation of the punches 122 perforates the card for the hour simultaneously with the perforating of the card by the activated tenth hour punch 86.

Figure 6:
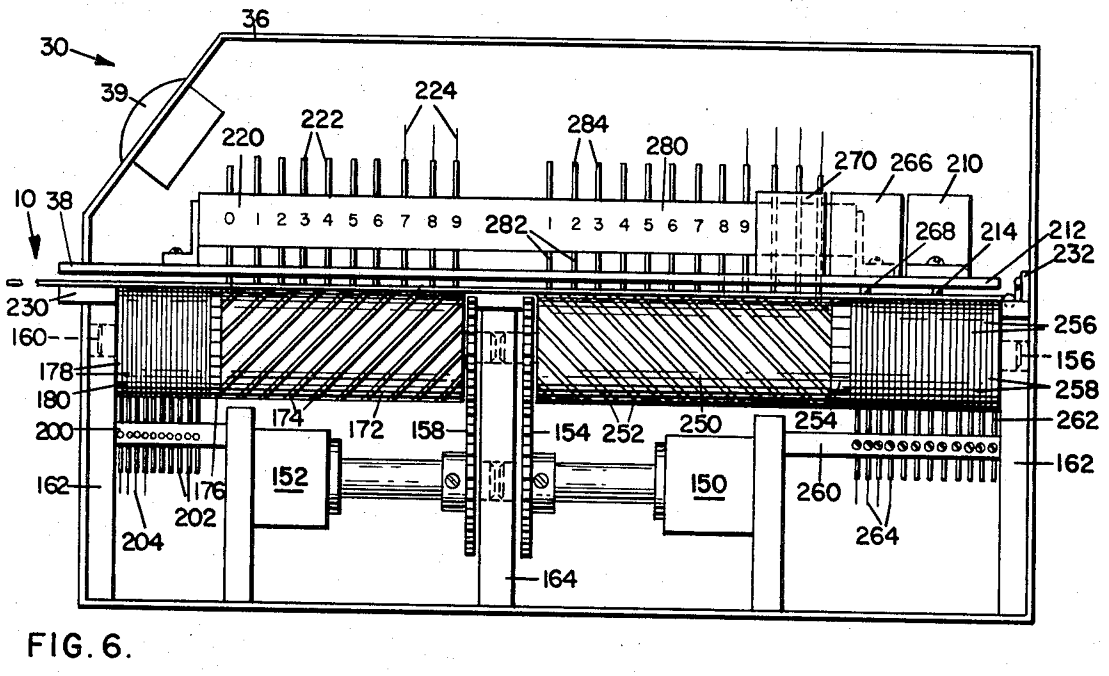
FIG. 6 is an enlarged view, in section, on line 6—6 of FIG. 2.
Figure 11:
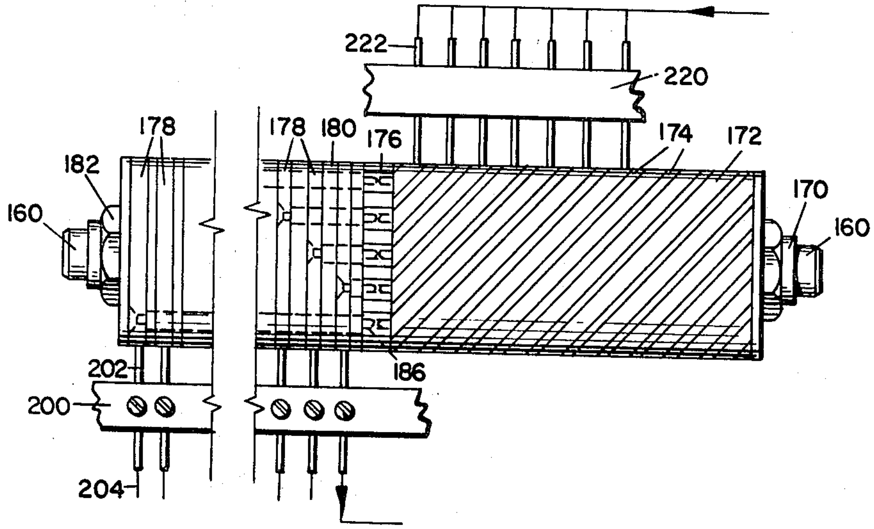
FIG. 11 is a broken detail view, in side elevation, of the tenths wheel of the punch-out subassembly.

With reference now to FIGS. 6 and 11, the prime controllers of the punch-out mechanism are synchronous electric clock motors 150 and 152, motor 150 being intergeared in usual manner by gearing 154 to an hour wheel shaft 156 and motor 152 being intergeared by gearing 158 to a tenths wheel shaft 160 disposed in coaxial alignment with the hour wheel shaft, each shaft being journalled in a respective bracket 162 fixed to a wall of the casing and to a centrally-located upright post 164. The arrangement is merely illustrative other arrangements being equally suitable.

Hour wheel shaft 156 is rotated 360° or one revolution in each twelve hours in twelve equal incremental movements and tenths wheel shaft 160 is rotated 360° or one revolution each hour in ten equal incremental movements. Preferentially, wheel shafts 156 and 160 are synchronized with wheel shafts 46 and 50 as closely as possible for purposes of accuracy, all incremental movements being desirably rapid and positive.

If desired, all of the wheel shafts of the construction may be driven by a single prime mover.

Tenths wheel shaft 160, as shown in FIG. 11, has sleeved therearound an insulated bushing 170 upon which a nonmetallic drum 172 is circumscribed, the drum periphery being provided with ten helically-arranged equi-spaced grooves, each of which grooves is filled with a slug of conductive material 174. Conceivably, in lieu of the slug-filled grooving, a printed circuit could be employed which could be suitably mounted on the drum periphery.

Adjacent the inboard end of drum 172, an annular transfer wheel 176 is disposed on shaft 160 and thereadjacent, on the inboard side, a series of ten annular metallic discs 178 are spaced from each other by an alternating series of annular non-metallic insulating discs 180, all being mounted on the shaft in circumscribing manner and held in tight adjacency with respect to each other by suitable means.

The assemblage of discs and transfer wheel is provided with ten circumferentially-arranged equi-spaced longitudinally-extending openings therethrough, through which openings lead lines 186 are extended, each having an inboard end terminating at and electrically connected to a respective one of the metallic discs 178 and an outboard end terminating at and being electrically-connected to a respective metallic slug 174 seated in a respective groove in drum 172.

Disposed below and in parallel relationship with tenth wheel shaft 160 in a brush carrier 200 which supports a plurality of upstanding brushes 202, there being one for each tenth of the hour from 0 to 9, each said brush being vertically disposed below its respective metallic disc 178 with one extremity being in continuous brushing contact therewith and with an opposite extremity being connected by a lead line 204, to a respective punch operator 210 of a bank of tenth punch operators disposed on a shelf 212 in the upper part of the casing and to a respective reader finger or finder to be referred to.

Each punch operator 210 includes a solenoid operated punch 214 having a capacity for piercing card 10 and retracting upon completion of the piercing operation.

Disposed above and in parallel relationship with the tenth hour assemblage is a reader finger or finder carrier 220 which supports ten equi-spaced finders or reader fingers 222, the lower end of each of which is in continual brushing contact with drum, each finger being in contact with one of the slugs 174 according to each increment of rotation of tenths wheel shaft 160 and drum 172 therewith.

The upper end of each finger 222 is connected by a lead line 224 to the respective punch operator 210 and to the respective lead line 204 connected to the respective brush 202.

It will be appreciated that, with each increment of rotation of tenths wheel shaft 160 and its supported drum, a different tenths of an hour is presented to each respective finger 222 due to the spiral arrangement of the slugs. That is, at one increment, each slug 174 representative of one tenth of an hour, is in contact with one of the fingers, but at the next increment of rotation, each slug has moved horizontally forwardly so that each finger is in contact with a new and different slug. Thus with each rotation a new slug, representative of a new tenth of an hour, is presented to each reader finger for wiping contact therewith.

When card 10 is properly inserted into the punch-out slot upon table 230, its forwardmost edge contacts a starting switch 232 suitably connected to the power supply as the card reaches its fully-extended position, my which time the card is properly aligned as by suitably-located guiding walls. As the card is inserted, all fingers 222 are moved away from their contacting positions with drum 172, the card interrupting their contacting positions as it is extended therebetween. As the card comes to rest at its fully-extended position, that finger, which overlies a perforation in the card, such as perforation 20, is allowed to resume its drum-contacting position by extending itself through the perforation. The finger thus functions as a finder and reader.

The finger, in finding the tenths hour perforation which was produced at the moment of punch in, now serves the function of reading the intelligence by causing to be activated that punch, representative of that tenth of an hour according to which slug the finger is at that moment in contact with, the circuit from the finger extending through the respective slug 174 on drum 172 and to the appropriate metallic disc 178 via transfer disc 176 so as to cause the appropriate brush 202 via lead line 204 to activate the appropriate punch 214.

Starting switch 232 being energized, and one of the fingers being in drum-contacting position, an electrical contact is made through that finger to the then contacted slug in the drum and outwardly therefrom to the respective metallic disc in contact with that slug and therefrom to the respective brush thence to the respective punch operator whereby a perforation is made in card 10 which shall be representative of the elapsed time in tenths of the hour.

The punch-out hour wheel is similarly constructed and accordingly is not detailed but is observable in FIG. 6.

Hour wheel shaft 156 sleeves a non-metallic drum 250 provided with twelve helically-arranged equi-spaced grooves, each filled with a slug of conductive material 252.

Adjacent the outboard end of drum 250, an annular transfer wheel 254 is shaft mounted and thereadjacent, on the inboard side, a series of twelve annular metallic discs 256 are spaced from each other by an alternating series of annular non-metallic insulating discs 258, all being shaft mounted, the components being held in relative positions as by nuts at its opposite ends.

The discs and transfer wheel are provided with twelve circumferentially-arranged equi-spaced longitudinally-extending openings therethrough, through which openings lead lines are extended with each having an outboard end terminating at and electrically connected to a respective one of the metallic discs 256 and an inboard end terminating at and electrically-connected to a respective metallic slug 252 seated in a respective groove in drum 250.

Disposed below and in parallel relationship with hour wheel shaft 156 is a brush carrier 260 which supports a plurality of upstanding brushes 262, there being one for each hour from 0 to 11, each said brush being vertically disposed below its respective metallic disc 256 with one extremity being in continuous brushing contact therewith and with an opposite extremity being connected by a lead line 264, to a respective punch operator of a bank of hour punch operators disposed on shelf 212.

A first set of punch operators 266 each include a solenoid operated punch 268 having a capacity for perforating card 10 and retracting upon completion of the piercing operation being connected so as to punch the hours of 0 to 9.

A second set of punch operators 270 includes a solenoid operated punch 272 being connected so as to punch the "1" for the reading of the hours of "10," "11" or "12."

Disposed above and in parallel relationship with the hour assemblage is a reader finger or finder carrier 280 which supports twelve equi-spaced reader fingers or finders 282, the lower end of each of which is in continual brushing contact with the drum, each reader finger being in contact with one of the slugs 252 according to each increment of rotation of hour wheel shaft 156 and drum 250 therewith.

The upper end of each reader finger 282 is connected by a lead line 284 to the respective punch operator and respective brush 262.

As card 10 is inserted into the punch out slot, and as the forwardmost edge thereof contacts starting switch 232, reading fingers 282 have been moved from out of their contacting positions with drum 250 except for that reading finger overlying a perforation such as 20 in the card, which finger resumes its drum-contacting position by extending itself through the card perforation.

The starting switch being energized, and the reading finger being in drum contacting position, an electrical contact is made through that reading finger to the then respective slug in the drum and outwardly therefrom to the respective metallic disc and therefrom to its respective brush to its respective punch operator whereby another perforation is made in card 10 which shall be representative of the elapsed time in hours.

Conceivably, signal means (not shown) can be incorporated to insure against card withdrawal, both during punch-in and punch-out, before the appropriate recordations have been made, all so as to guard against unwanted damage to the card.

I claim:

1. A mechanism for computing and recording a quantitative value such as elapsed time by registering the commencement and termination of a mathematical progression of time and computing and recording the duration of the time interval between the commencement and termination and comprising:

(1) a record-receiver;

(2) a punch-in mechanism including:

(a) a clock-operated time-in wheel incrementally rotatable through a revolution representative of a predetermined time period with each increment of rotation being representative of a portion of the time period and with a different portion of the wheel and of the time period represented thereby being disposed in a signalling position with each increment of rotation, (b) a first perforating means having a plurality of punch mechanisms each representative of one of the portions of the time period, (c) a time-in support means for orienting the record-receiver with respect to the first perforating means, (d) electrical means powered by a power source and connecting between each punch mechanism of the first perforating means and each of the portions of the time-in wheel for energizing only the punch mechanism of the first perforating means representative of that portion of the wheel and of the time period in the signalling position upon the assumption by the record-receiver of all oriented position on the time-in support means and perforating the record-receiver with a first perforation representing the commencement of the measured time increment;

(3) a punch-out mechanism including:

(a) a clock-operated time-out wheel being incrementally rotatable through a revolution representative of a total elapsed time period with increment of rotation being representative of a portion of the elapsed time period and with a different portion horizontally of the wheel and of the elapsed time period represented thereby being disposed in a reading and signalling position with each increment of rotation, (b) a record-receiver reading means comprising a plurality of reading fingers, (c) a second perforating means having a plurality of punch mechanisms each representative of a period of elapsed time, (d) a time-out support means for orienting the record receiver with respect to the reading means for the reading of a perforation in the record receiver by the extension therethrough of a finger of the reading means and with respect to the second perforating means, (e) electrical means powered by a power source and connecting between each punch mechanism of the second perforating means and the reading finger of the reading means extending through a perforation in the record receiver to the underlying portion of the time-out wheel for energizing the punch mechanism of the second perforating means representative of the portion of the wheel and the elapsed time period which is in the reading and the signalling position upon the assumption by the record-receiver of an oriented position on the time out support means and perforating the record-receiver with a second perforation representing the elapsed time since the commencement of the measured time increment.

2. A mechanism for computing and recording a quantitative value such as a value of an elapsed time period by registering the commencement and termination of a mathematical progression of time and computing and recording the value of the duration of the time interval between the commencement and termination and comprising:

(1) a record-receiver;

(2) a punch-in mechanism including:

(a) a clock-operated time-in wheel incrementally rotatable through a revolution representative of a predetermined time period with each increment of rotation being representative of a portion of the time period and with a different portion of the wheel and of the time period represented thereby being disposed in a signalling position with each increment of rotation, (b) a first perforating means having a plurality of punch mechanisms each representative of one of the portions of the time period.

(c) a time-in support means for orienting the record-receiver with respect to the first perforating means, (d) electrical means powered by a power source and connecting between each punch mechanism of the first perforating means and each of the portions of the time-in wheel for energizing only the punch mechanism of the first perforating means representative of that portion of the wheel and of the time period in the signalling position upon the assumption by the record-receiver of an oriented position on the time-in support means and perforating the record-receiver with a first perforation representing the commencement of the measured time increment;

(3) a punch-out mechanism including:

(a) a clock-operated time-out wheel being incrementally rotatable through a revolution representative of a total elapsed time period with each increment of rotation being representative of a portion of the elapsed time period and with a different portion horizontally of the wheel and of the elapsed time period represented thereby being disposed in a reading and signalling position with each increment of rotation, (b) a record-receiver reading means comprising a plurality of reading fingers, (c) a second perforating means having a plurality of punch mechanisms each representative of a value of a period of elapsed time, (d) a time-out support means for orienting the record-receiver with respect to the reading means for the reading of a perforation in the record-receiver by the extension therethrough a finger of the reading means and with respect to the second perforating means, (e) electrical means powered by a power source and connecting between each punch mechanism of the second perforating means and the reading finger of the reading means extending through a perforation in the record-receiver to the underlying portion of the time-out wheel for energizing the punch mechanism of the second perforating means representative of the portion of the wheel and the elapsed time period which is in the reading and signalling position upon the assumption by the record-receiver of an oriented position on the time-out support means and perforating the record-receiver with a second perforation representing the value of the elapsed time since the commencement of the measured time increment.

3. A mechanism for computing and recording a quantitative value such as elapsed time by registering the commencement and termination of a mathematical progression of time and computing and recording the duration of the time interval between the commencement and termination and comprising:

(1) a record-receiver;

(2) a punch-in mechanism including:

(a) a pair of clock-operated time-in wheels each incrementally rotatable through a revolution representative of a predetermined time period with each increment of rotation being representative of a portion of the time period and with a different portion of the wheel and of the time period represented thereby being disposed in a signalling position with each increment of rotation and with one of the time-in wheels representing the hours and the other of the time-in wheels representing the minutes, (b) a first perforating means having a plurality of punch mechanisms each representative of one of the portions of the time period, (c) a time-in support means for orienting the record-receiver with respect to the first perforating means, (d) electrical means powered by a power source and connecting between each punch mechanism of the first perforating means and each of the portions of the time-in wheels for energizing only the punch mechanisms of the first perforating means representative of those portions of the wheels and of the time periods in the signalling positions upon the assumption by the record-receiver of an oriented position on the time-in support means and perforating the record-receiver with a set of first perforations representing the commencement of the measured time increment in terms of hours and minutes;

(3) a punch-out mechanism including:

(a) a pair of clock-operated time-out wheels being each incrementally rotatable through a revolution representative of a total elapsed time period with each increment of rotation being representative of a portion of the elapsed time period and with a different portion horizontally of the wheel and of the elapsed time period represented thereby being disposed in a reading and signalling position with each increment of rotation and with one of the time-out wheels representing the hours and the other of the time-out wheels representing the minutes, (b) a record-receiver reading means comprising a plurality of reading fingers, (c) a second perforating means having a plurality of punch mechanisms each representative of a period of elapsed time, (d) a time-out support means for orienting the record-receiver with respect to the reading means for the reading of the perforations in the record-receiver by the extension therethrough of the fingers of the reading means and with respect to the second perforating means, (e) electrical means powered by a power source and connecting between each punch mechanism of the second perforating means and the reading fingers of the reading means extending through the perforations in the record-receiver to the underlying portions of the time-out wheels for energizing the punch mechanisms of the second perforating means representative of the portions of the wheel and the elapsed time periods which are in the reading and signalling position upon the assumption by the record-receiver of an oriented position on the time-out support means and perforating the record-receiver with a set of second perforations representing the elapsed time since the commencement of the measured time increment.

4. A mechanism for computing and recording a quantitative value such as a value of an elapsed time period by registering the commencement and termination of a mathematical progression of time and computing and recording the value of the duration of the time interval between the commencement and termination and comprising:

(1) a record-receiver;

(2) a punch-in mechanism including:

(a) a pair of clock-operated time-in wheels each incrementally rotatable through a revolution representative of predetermined time period with each increment of rotation being representative of a portion of the time period and with a different portion of the wheel and of the time period represented thereby being disposed in a signalling position with each increment of rotation and with one of the time-in wheels representing the hours and the other of the time-in wheels representing the minutes, (b) a first perforating means having a plurality of punch mechanisms each representative of one of the portions of the time period, (c) a time-in support means for orienting the record-receiver with respect to the first perforating means, (d) electrical means powered by a power source and connecting between each punch mechanism of the first perforating means and each of the portions of the time-in wheel for energizing only the punch mechanism of the first perforating means representative of that portion of the wheel and of the time period in the signalling position upon the assumption by the record-receiver of an oriented position on the time-in support means and perforating the record-receiver with a set of first perforations representing the commencement of the measured time increment in terms of hours and minutes;

(3) a punch-out mechanism including:

(a) a pair of clock-operated time-out wheels each being incrementally rotatable through a revolution representative of a total elapsed time period with each increment of rotation being representative of a portion of the elapsed time period and with a different portion horizontally of the wheel and of the elapsed time period represented thereby being disposed in a reading and signalling position with each increment of rotation and with one of the time-out wheels representing the hours and the other of the time-out wheels representing the minutes, (b) a record-receiver reading means comprising a plurality of reading fingers, (c) a second perforating means having a plurality of punch mechanisms each representative of a value of a period of elapsed time, (d) a time-out support means for orienting the record receiver with respect to the reading means for the reading of a perforation in the record receiver by the extension therethrough of a finger of the reading means and with respect to the second perforating means, (e) electrical means powered by a power source and connecting between each punch mechanism of the second perforating means and the reading finger of the reading means extending through the perforations in the record receiver to the underlying portions of the time-out wheel for energizing the punch mechanism of the second perforating means representative of the portion of the wheel and the elapsed time period which are in the reading and signalling position upon the assumption by the record-receiver of an oriented position on the time-out support means and perforating the record-receiver with a set of second perforation representing the value of the elapsed time since the commencement of the measured time increment.

References Cited

UNITED STATES PATENTS

| | | | |
|---|---|---|---|
| 1,190,217 | 7/1916 | Bryce | 346—60 |
| 2,663,497 | 12/1953 | Straus | 235—61.8 |
| 3,030,013 | 4/1962 | Moodie et al. | 235—61.8 |
| 3,109,088 | 10/1963 | Lyner | 235—61.9 |

JOSEPH W. HARTARY, Primary Examiner

U.S. Cl. X.R.

346—95; 235—61.1, 61.8